Sept. 18, 1934. V. N. MARKER ET AL 1,974,080
CLAMP FITTING
Filed March 10, 1933  2 Sheets-Sheet 1
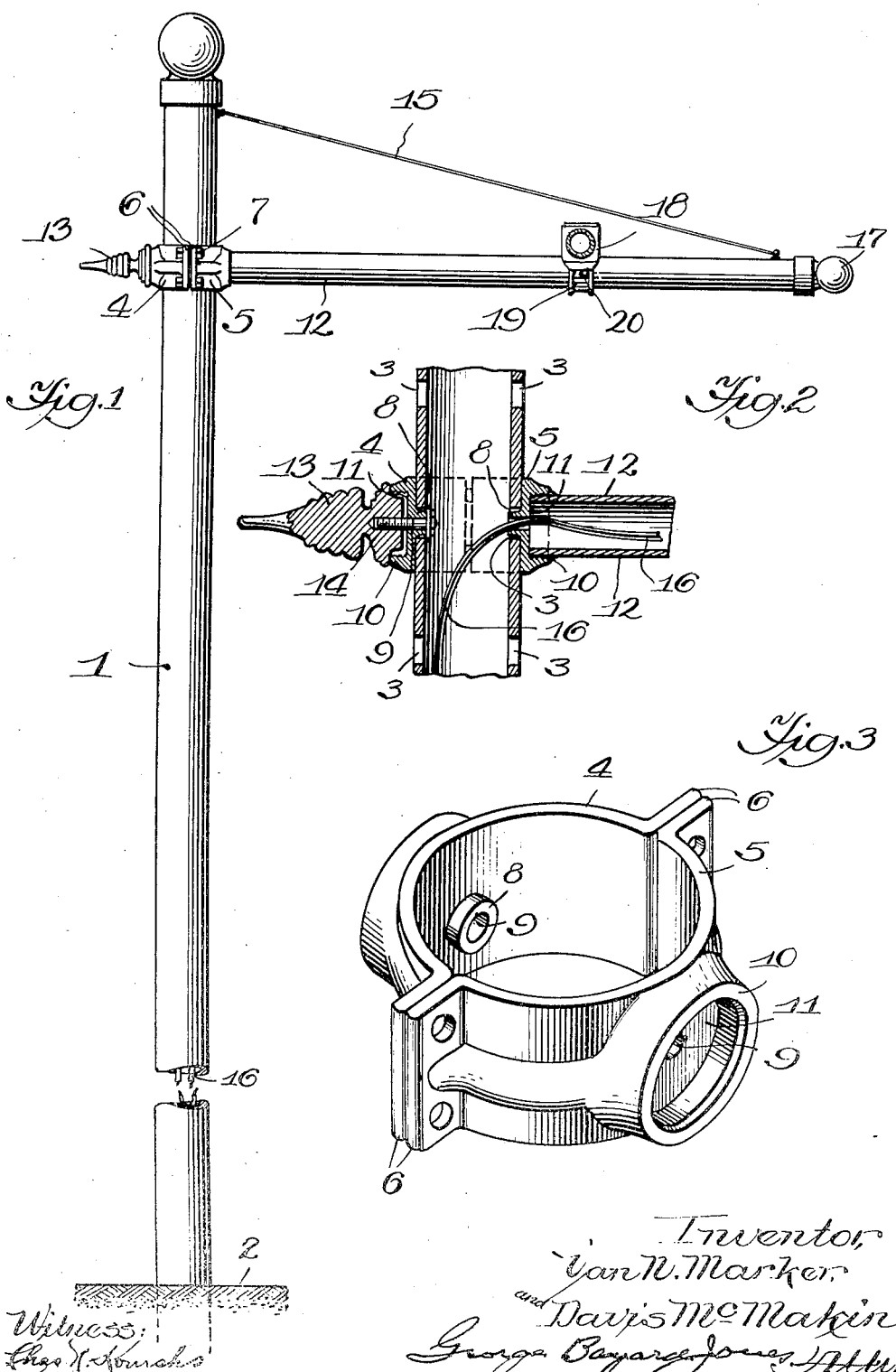

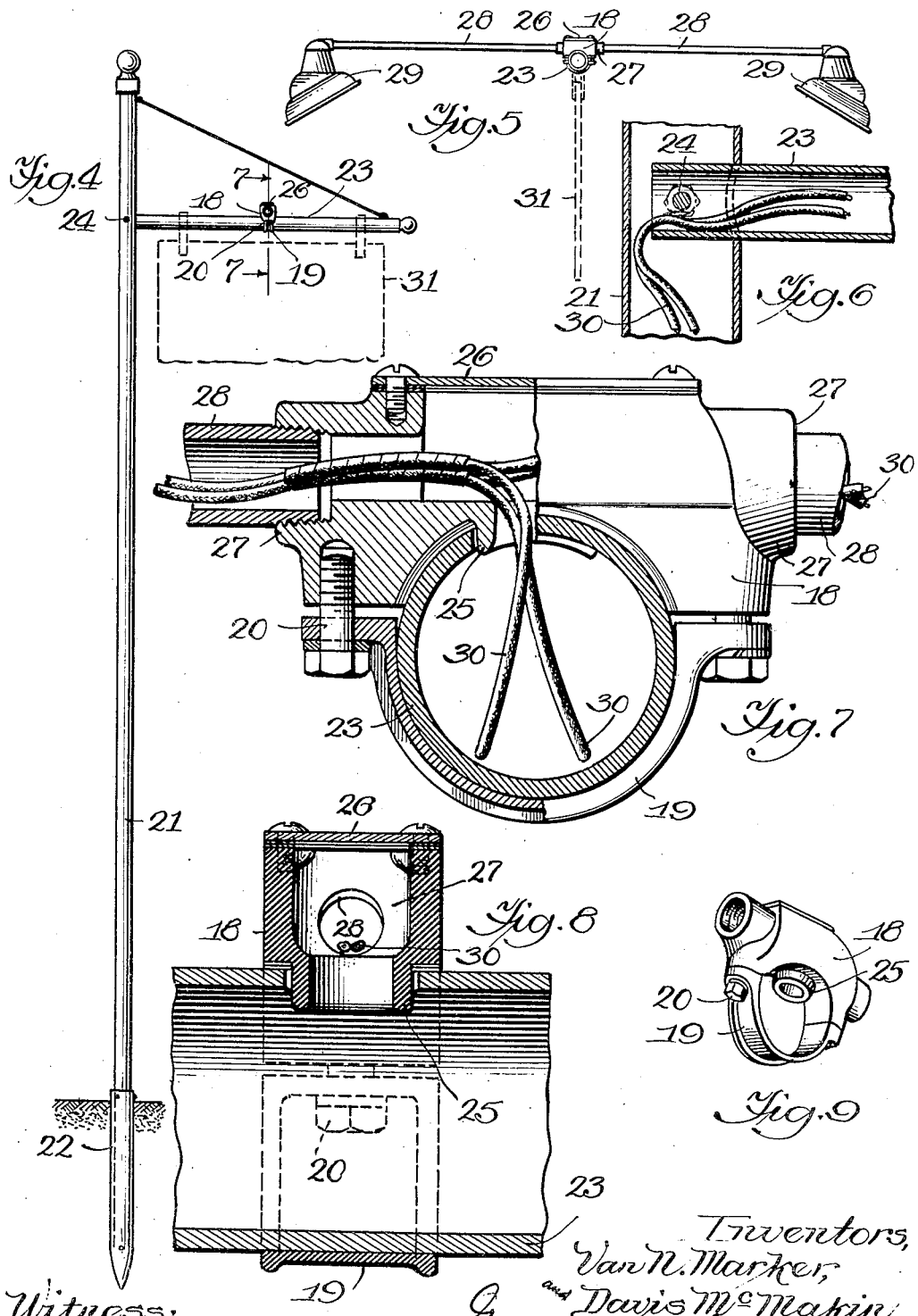

Patented Sept. 18, 1934

1,974,080

UNITED STATES PATENT OFFICE 1,974,080

CLAMP FITTING

Van N. Marker and Davis McMakin, Chicago, Ill., assignors to Revere Electric Company, a corporation of Illinois Application March 10, 1933, Serial No. 660,244

3 Claims. (Cl. 247—15)

This invention relates to improvements in clamp fittings whereby tubular members such as pipes may be secured to each other in such a way that one tubular member projects from the other at an angle and is supported thereby, the interior of the tubes having open communication with each other through the clamp fitting, whereby electrical conductors may be run from one to the other through said fitting, the conductors being thus concealed and protected.

One use for a structure of this character is in the field of signs, or similar displays, hung from a cross arm on a post and illuminated on one or both sides by incandescent lamps also supported from a cross arm or suitable brackets.

The present improvement contemplates the use of a vertical post or pipe with its lower end anchored in the ground or mounted on a suitable base, said post having a clamp secured thereto at the height desired for the cross arm or for two cross arms where it is desired to have two pipes extending horizontally from opposite sides of the post. One member of the clamp has an annular ring or rib projecting outwardly, horizontally, and forming a seat for the horizontal pipe or tube which may be welded or otherwise secured in said seat. Said member also has an inwardly projecting lug or boss with a hole through it, the lug fitting in a hole provided in the vertical post. When the clamp members are assembled on the post and bolted to each other around said post, the lug in said hole provides a positive engagement between the clamp and the post instead of a frictional clamping engagement only, with the result that the clamp may carry considerable weight of cross arms and parts supported thereby and it is also prevented from turning about the vertical axis of said post. In other words, it is held against movement both vertically and horizontally.

In like manner the cross arm or horizontal pipe may have a detachable clamp fitted to it by means of a hollow lug received within an opening in said pipe and may support another horizontal pipe at right angles to it, the clamps permitting insulated conductors to be run up through the vertical pipe, through the tubular cross arm or arms and at right angles through additional tubular members or brackets to incandescent lamps or some form of outlet.

In the accompanying drawings several embodiments of the invention are illustrated:

Fig. 1 is an elevation of a vertical post and a cross arm secured thereto by a clamp fitting;

Fig. 2 is an enlarged vertical section through said fitting and vertical post;

Fig. 3 is an enlarged perspective view of a commercial form of clamp fitting;

Fig. 4 is an elevation of a modified form of post and cross arm;

Fig. 5 is an end elevation of the cross arm and parts carried thereby;

Fig. 6 is an enlarged vertical central section through the juncture of the vertical post and horizontal cross arm;

Fig. 7 is an enlarged elevation partly in section of a modified form of clamp fitting;

Fig. 8 is a central sectional elevation at right angles to the one shown in Fig. 7; and Fig. 9 is a perspective view of said clamp fitting on a smaller scale.

As shown in Fig. 1, the post 1 may be a tubular metal post of cylindrical form secured in a foundation 2, such as concrete and having opposite openings 3 therein at the height above the ground where it is desired to locate the cross arm. The clamp fitting shown in perspective in Fig. 3, consists of two separable parts 4 and 5, each having flanges 6 which may be held together by bolts 7. Either one or both of the clamping members 4, 5 may have a hollow boss or lug 8 projecting inwardly therefrom with an opening 9 therethrough. Said lug is received in one of said openings 3 in the post, or, where two lugs are employed as shown in Fig. 2, they are received within the opposite openings and the parts held together by bolts. Not only does the fitting maintain a firm frictional engagement on the upright post, but it also has positive engagement therewith to prevent it from slipping down, in addition to which it is impossible to rotate it about the vertical axis of said post.

The size and shape of said clamp fitting may vary within wide limits, depending upon the use to which it is put, and in the present case the two parts are preferably exact duplicates of each other, whereby one pattern only need be used for the casting. It is obvious, however, that for most purposes one lug will be sufficient.

Each of the two clamp members has an annular rib or ring 10 projecting outwardly therefrom in a horizontal direction having a bottom partition 11 forming a seat and concentrically located with reference to the opening 9. The cross arm which is shown in the form of a pipe or tube 12 of less diameter than the upright support, is received within the seat referred to and may be secured therein preferably by welding, although for some purposes it may have screw threaded engagement with the ring 10 if the latter is made a little longer.

A similar pipe may likewise be secured in the opposite seat so that the two pipes project from the post in opposite directions in alignment with each other, although where a cross arm on one side of the post only is desired, the seat of the other side may be covered with a suitable ornamental device 13 which may be secured in place by a stud 14, as shown in Fig. 2.

The cross arm may be braced by any suitable tension member 15, if necessary, which may be made ornamental or otherwise.

Conductors 16 extend up through the vertical post and may be led out through the opening 9 in one of the clamp members, as shown in Fig. 2, and thus extend to any suitable outlet on the cross arm or at the end thereof. In Fig. 1, the end of said cross arm is closed by an ornamental cap 17 and the conductors are brought out through an outlet structure 18 in the form of a special clamp fitting, part of which, in the form of a semi-circular strap 19, is detachably held to the main body of the fitting by studs 20 or the like. This fitting will be described more in detail in connection with the modified form of structure illustrated in the remaining figures of the drawings.

In Fig. 4, the modified form of the equipment may be assumed to be somewhat lighter than that described, although not necessarily so. The pipe 21 is received within a sleeve 22, or other suitable anchorage, and has a cross arm 23 projecting therefrom and received within an opening, at a suitable height, as shown in Fig. 6, the tubes being held together by a bolt 24, a rivet or the like.

The cross arm supports a special form of outlet box or clamp fitting, having many features in common with the clamp fitting described in connection with Fig. 1, and consists of a box or hollow casting 18 shaped on one side to conform to the curvature of the pipe 23 and held thereto by the semi-circular strap 19 and studs 20.

The main body or upper half of the clamp fitting is provided with a circular lug 25 received within an opening in the horizontal pipe 23 in a manner similar to that previously described in connection with Fig. 2. In other words, said hollow lug positions the clamp longitudinally on the cross arm 23 and prevents rotation about a horizontal axis.

The main part of the clamp or hollow casting 18 is provided with a removable cover 26 to give access to the interior. Said casting is formed with oppositely projecting bosses 27 which are screw threaded to receive correspondingly screw threaded pipes 28, which latter, as shown in Fig. 5, may support incandescent lamps and reflectors 29 at opposite ends of the transverse pipe sections 28.

Suitable conductors 30 pass upwardly through the pipe 21 and horizontally within the pipe 23, as shown in Fig. 6, and are thereafter brought into the main part of the hollow clamp structure or outlet box 18 as shown in Fig. 7 and connected to transverse conductors extending through the pipes 28 to the lamps. One or a plurality of these special clamp fittings or outlets may be mounted on the horizontal pipe 23 by providing the necessary openings therein, preferably in the top of said pipe, although of course they may be otherwise located, depending on the direction in which the branch pipe 28 is to extend. It will be noted that the lower end of the rib 25 is flared outwardly to facilitate drawing the conductors through the opening without abrading the insulation.

The lamps, where two of them are used, are intended to illuminate both sides of some object located between them, as for example, a sign 31, suspended from the cross arm 23. Illuminated signs of this character are frequently employed at gasoline filling stations and the structure described is particularly well adapted for the purpose, being simple, relatively inexpensive to manufacture and assemble, with positive engagement of parts which enable them to resist twisting on their respective supports due to wind and other forces. Also, the conductors are entirely concealed and protected from the elements.

Where the structure is under cover, the vertical post in Fig. 1 may have a series of oppositely arranged pairs of openings at different elevations where it may be necessary or desirable to change the location of the cross arm or where it is not known in advance what elevation will be desired or for other purposes.

Also, a series of openings may be provided in the post shown in Fig. 4, to permit similar flexibility in the location of the horizontal cross arm. In like manner the cross arm itself or horizontal pipe may have a series of openings provided therein where the pipe is not exposed to rain or other moisture, although it is preferable to have no more openings than are covered by the clamp fittings.

We claim:

1. A device of the class described comprising a box having a removable cover, a base having a cylindrical recess therein, said base having a hollow projection thereon which communicates with the interior of said box and a clamping member for said box.

2. A device of the class described comprising a box having a base with a cylindrical recess therein, an apertured boss projecting from said base, a removable cover on the opposite side of said box, screw threaded bosses on each end of said box and a semi-circular clamp with means for detachably securing it to said base, whereby said box may be clamped about a pipe with said apertured boss projecting through an opening therein and conductors from said pipe may be led out through said apertured boss and through the openings in said end bosses and access thereto may be had by removing said cover, said apertured boss serving to position said box on said pipe in fixed position longitudinally and circumferentially.

3. The combination of a pipe having an opening therein, of a box having a concave surface fitting said pipe and a projecting rib fitting the opening in said pipe to position said box thereon, a clamping member embracing said pipe and detachably secured to said box, and a removable cover, said box having aligned openings in opposite sides, the axis of which passes near said rib but without intersecting said pipe, said rib having a rounded edge to prevent abrasion of conductors passing through said pipe to said box.

VAN N. MARKER.
DAVIS McMAKIN.